US005749145A

United States Patent [19]

Baukloh

[11] Patent Number: 5,749,145

[45] Date of Patent: May 12, 1998

[54] EGG CUTTER

[76] Inventor: Horst Baukloh, Südstrasse 8, D-58540 Meinerzhagen, Germany

[21] Appl. No.: 859,661

[22] Filed: May 20, 1997

[30] Foreign Application Priority Data

Jun. 28, 1996 [DE] Germany ........................ 196 25 914.2

[51] Int. Cl.$^6$ ........................ B26B 3/00; A21C 5/08; A22C 9/00

[52] U.S. Cl. ........................ 30/114; 30/117; 30/303; 30/304; 83/597; 83/932; 99/537; 99/538; D7/673; D7/695

[58] Field of Search ........................ 99/537, 538, 543, 99/545; 30/114, 116, 117, 303–305, 120.3; 83/597, 932, 651.1; D7/673, 695, 696

[56] References Cited

U.S. PATENT DOCUMENTS

| | | | |
|---|---|---|---|
| D. 272,224 | 1/1984 | Reinhard | D7/695 |
| 3,060,339 | 10/1962 | Priore | 99/538 X |
| 3,561,511 | 2/1971 | Kummer | 99/537 X |
| 4,095,339 | 6/1978 | Turner | 30/114 |
| 4,383,365 | 5/1983 | Metzigian | 30/117 X |
| 4,557,053 | 12/1985 | Hadley, Jr. | 30/114 X |
| 4,625,607 | 12/1986 | Maillez | 30/114 X |
| 4,646,602 | 3/1987 | Bleick | 30/117 X |
| 4,852,256 | 8/1989 | Schoettler | 99/537 X |
| 4,937,938 | 7/1990 | Koo | 30/304 X |
| 4,998,348 | 3/1991 | Foate | 30/305 X |
| 5,035,056 | 7/1991 | Sheffield | 30/305 |
| 5,499,578 | 3/1996 | Payne | 99/537 |

*Primary Examiner*—Timothy F. Simone
*Attorney, Agent, or Firm*—Edwin D. Schindler

[57] ABSTRACT

An egg cutter comprising a rectangular base plate which has webs running parallel to a first lateral edge and separated by gaps, the profile of which webs forms an elliptical depression in which to place an egg, and comprising a cutting frame which is pivotable about a second lateral edge, oriented perpendicularly to the first lateral edge, of the base plate and has parallel-tensioned wires aligned with the gaps between the webs, for cutting slices. The technical problem is to provide an egg cutter suitable both for cutting eggs into slices and for cutting them into pieces. A second cutting frame for cutting pieces is pivotable about an axis parallel to the second lateral edge and has cutting wires arranged in the shape of a star, and cross slots are provided in the webs of the base plate to correspond to the cutting wires. FIG. 1.

4 Claims, 3 Drawing Sheets

EGG CUTTER

BACKGROUND OF THE INVENTION

1. Field of the Invention

The invention relates to an egg cutter comprising a rectangular base plate which has webs running parallel to a first lateral edge and separated by gaps, the profile of which webs forms an elliptical depression in which to place an egg, and comprising a cutting frame which is pivotable about a second lateral edge, oriented perpendicularly to the first lateral edge, of the base plate and has parallel-tensioned wires aligned with the gaps between the webs, for cutting slices.

2. Description of the Prior Art

Egg cutters for forming round or oval slices from an egg are known. The egg can be placed in the depression of the base plate perpendicularly and parallel to the pivot axis of the cutting frame. Also known are egg cutters for cutting eggs into sector-shaped pieces. Here, the egg is received with the longitudinal axis parallel to the direction of movement of the cutting frame in a cup-shaped base mounting having slots in the wall.

SUMMARY OF THE INVENTION

The object of the invention is to provide an egg cutter suitable both for cutting eggs into slices and for cutting them into pieces.

This object is achieved according to the invention in that a second cutting frame is pivotable about an axis parallel to the second lateral edge and has cutting wires arranged in the shape of a star, and in that cross slots are provided in the webs of the base plate to correspond to the cutting wires.

The invention differs from the prior art in that the depression of the base plate is formed by the cross slots in the webs for cooperation with the second cutting frame having cutting wires arranged in the shape of a star.

Reliable cutting into pieces is ensured in that the cross slots extend into the webs of the base plate approximately as far as the upper side of the base wall of the base plate. The second cutting frame can thus be pivoted or moved until it rests flat on the upper side of the base plate.

The cutting frames may be arranged on a common pivot axis in such a way that the frame for cutting into pieces is arranged between the frame for cutting into slices and the base plate and that both cutting frames are coaxially mounted and individually pivotable.

A protected accommodation of the frame for cutting into pieces is possible in that the frame for cutting into pieces lies between foot portions of the base plate and in that a pin serving as a pivot axis is displaceable into a pivot bearing above the plane of the base plate.

BRIEF DESCRIPTION OF THE DRAWING

Exemplary embodiments of the invention are explained with reference to the drawings, in which.

DESCRIPTION OF THE PREFERRED EMBODIMENTS

Figure 2:
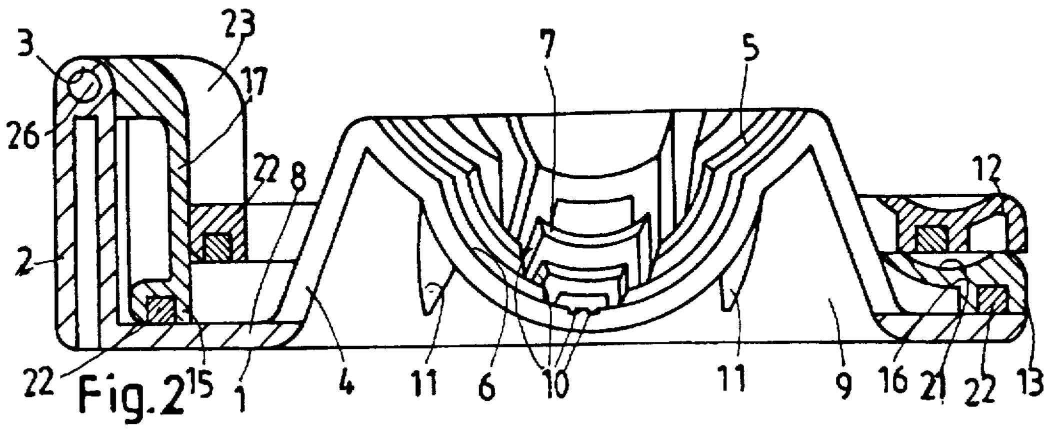
FIG. 2 shows a section taken on the line II—II in FIG. 1.
Figure 1:
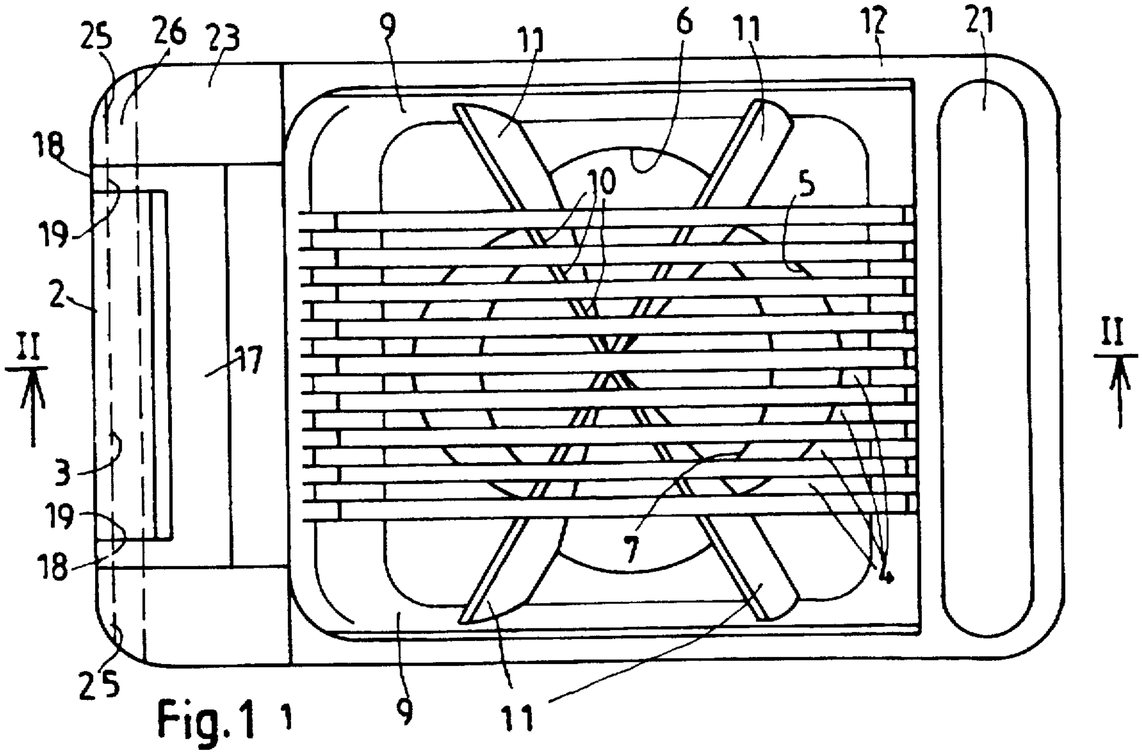
FIG. 1 shows a plan view of the egg cutter.
Figure 3:
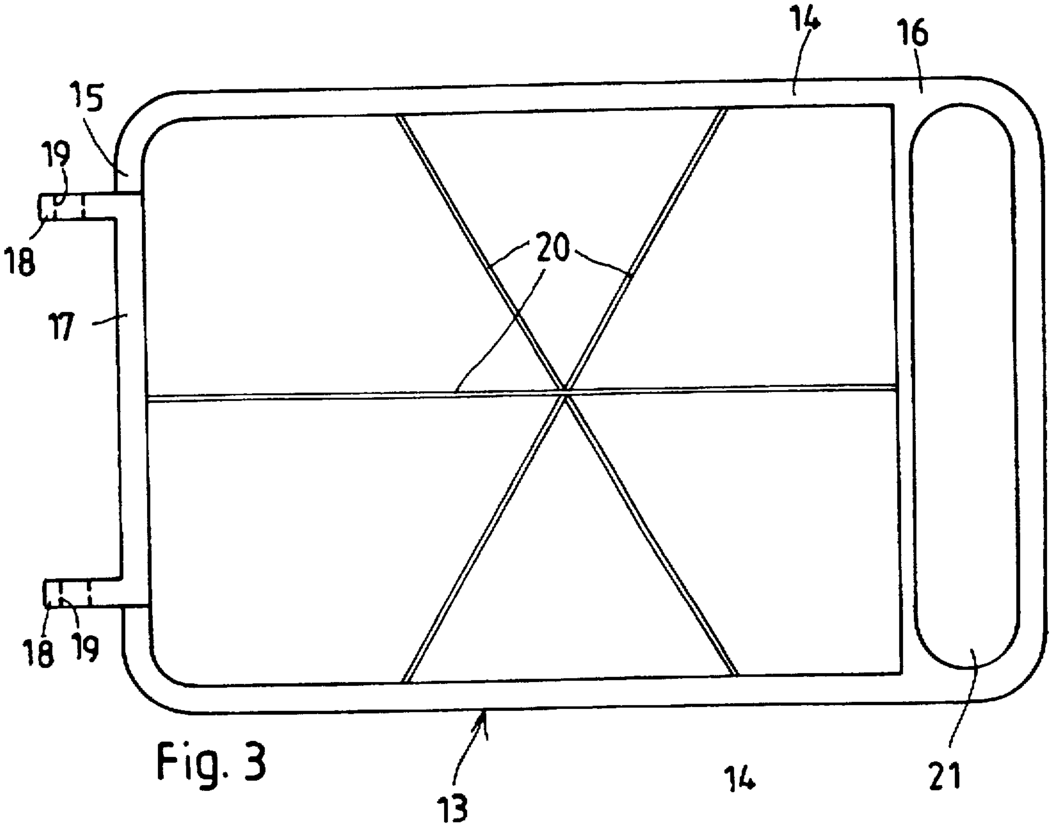
FIG. 3 shows a plan view of the frame for cutting into pieces.

The exemplary embodiment shown in FIGS. 1 to 3 has an approximately rectangular base plate 1, to one narrow lateral edge of which there is attached in the central region a vertically projecting wall 2 having a passage 3 parallel to the plane of the base plate 1 and parallel to the lateral edge. A plurality of webs 4 are formed perpendicularly to said lateral edge, the profile of which webs forming in the surface two elliptical depressions 5, 6 oriented perpendicularly to one another and a circular depression 7, so that an egg can be placed in these depressions in various orientations. The elliptical depressions 5, 6 receive an egg in a lying orientation parallel to the lateral edges of the base plate 1 and the circular depression 7 receives an egg in an upright position.

The base plate has a substantially plane base wall 8, from which the webs 4 and also the side walls 9 emerge. Cross slots 10, 11 aligned with the center of the depression 7 are formed in the webs 4 and the side walls 9. The cross slots 10 and 11 extend down approximately as far as the upper side of the base wall 8 of the base plate, as can be clearly seen in FIG. 2. In the region of both narrow lateral edges, the base wall 8 of the base plate 1 has plane portions aligned with one another at the same height.

A first cutting frame 12 and a second cutting frame 13 are pivotably arranged on the wall 2. The second cutting frame 13 comprises rectangularly arranged strips 14, 15, 16. Projecting upwardly from the strip 15 is a limb 17 having two eyes 18, the passages 19 of which can be aligned with the passage 3. A pin 26, for example a rollpin, about which the second cutting frame 13 can be pivoted, is insertable into the passages 3 and 19.

Three cutting wires 20 are tensioned in a star shape between the strips 14, 15, 16, see FIG. 3. The strip 16 has a gripping depression 21 on the upper side. Pads 22 are inserted in the channels of the underside of the strips 14, 15, 16 in order to brake the cutting frame 13 during pivoting. The cutting wires 20 enter the cross slots 10, 11 fully in the pivoted-down state of the cutting frame 13 and lie below the lowest point of the depressions 5, 6, 7.

The first frame 12 is likewise a rectangular frame. Seated on the narrow side 22 are limbs 23 having passages 25 which can likewise be aligned with the passage 3. The pin 26, which serves as the pivot axis for both cutting frames 12 and 13 and about which both cutting frames 12 and 13 are individually pivotable, is inserted into the mutually aligned passages 3, 19, 25. The cutting frame 12 carries, perpendicularly to the narrow sides 22, cutting wires (not shown) aligned with the slots between the webs 4.

In summary, the egg cutter functions as follows: for cutting an egg into slices, the first cutting frame 12 is lifted up. The egg is placed in a depression 5 or 6 depending on whether round or oval slices are required. The cutting frame 12 is lowered. During this procedure, the cutting wires cut the egg into slices and enter the slots between the webs 4.

For cutting an egg into sector-shaped pieces, both cutting frames are lifted up. The egg is placed, upright, in the circular depression 7. The cutting frame 13 is lowered, with the result that the egg is cut into pieces. The cutting wires 20 of the cutting frame 13 enter the cross slots 10, 11.

Figure 5:
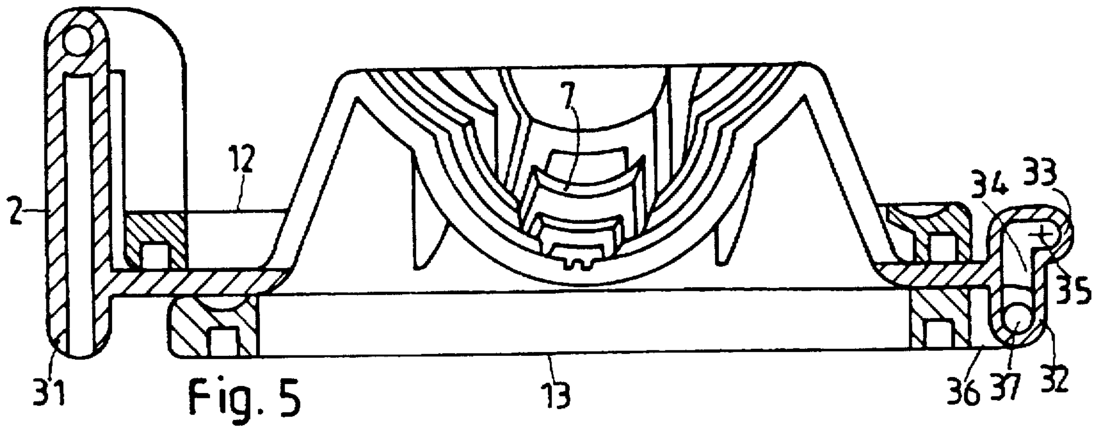
FIG. 5 shows a section pertaining to FIG. 4.
Figure 4:
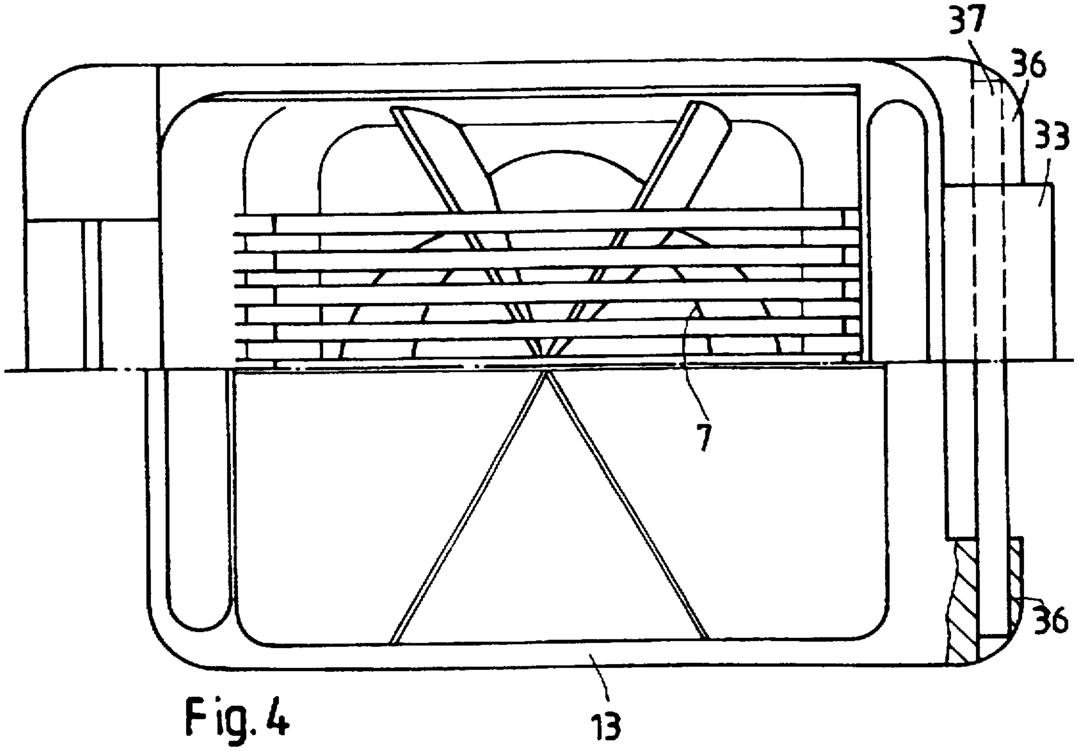
FIG. 4 shows a plan view of a second exemplary embodiment, half broken open.

FIGS. 4 and 5 show a modified exemplary embodiment of the invention. The base plate 1 is raised. The wall 2 is lengthened into a foot portion 31. Located on the opposite narrow side is an attached portion 33 having a foot portion 32. The attached portion 33 has an L-shaped slot 34, the upper leg of which serves as the pivot bearing or pivot axis 35 for the frame 13 for cutting into pieces. Eye projections 36 of the frame 13 for cutting into pieces can be aligned with the slot 34 and receive a pin 37 which serves as the pivot axis for the frame 13 for cutting into pieces. The cutting frame 12 for slices is of corresponding construction.

The frame 13 for cutting into pieces normally lies in the foot region of the base plate 1. For cutting into pieces, the frame 12 for cutting into slices is lowered. The frame 13 for cutting into pieces is turned down, and the pin 37 is aligned within the slot 34 with pivot axis 33. After the egg has been placed, upright, in the circular depression 7, the frame 13 for cutting into pieces can be turned round, with the result that the egg is cut into pieces.

I claim the following:

1. An egg cutter comprising a rectangular base plate which has webs running parallel to a first lateral edge and separated by gaps, the profile of which webs forms an elliptical depression in which to place an egg, and comprising a cutting frame which is pivotable about a second lateral edge, oriented perpendicularly to the first lateral edge, of the base plate and has parallel-tensioned wires aligned with the gaps between the webs, for cutting slices, wherein a second cutting frame for cutting pieces is pivotable about an axis parallel to the second lateral edge and has cutting wires arranged in the shape of a star, and wherein cross slots are provided in the webs of the base plate to correspond to the cutting wires.

2. An egg cutter as claimed in claim 1, wherein the cross slots extend into the webs of the base plate approximately as far as the upper side of the base wall of the base plate.

3. An egg cutter as claimed in claim 1, wherein the frame for cutting into pieces is arranged between the frame for cutting into slices and the base plate and wherein both cutting frames are coaxially mounted and individually pivotable.

4. An egg cutter as claimed in claim 1, wherein the frame for cutting into pieces lies between foot portions of the base plate and wherein a pin serving as a pivot axis is displaceable into a pivot bearing above the plane of the base plate.

* * * * *